United States Patent
Mochizuki

(10) Patent No.: US 9,139,070 B2
(45) Date of Patent: Sep. 22, 2015

(54) ARRANGEMENT STRUCTURE FOR AIR-CONDITIONING COMPRESSOR IN HYBRID ELECTRIC VEHICLE

(75) Inventor: Yoshihito Mochizuki, Shizuoka-Ken (JP)

(73) Assignee: SUZUKI MOTOR CORPORATION, Hamamatsu-shi, Shizuoka-Ken (JP)

( * ) Notice: Subject to any disclaimer, the term of this patent is extended or adjusted under 35 U.S.C. 154(b) by 189 days.

(21) Appl. No.: 13/982,376

(22) PCT Filed: Feb. 21, 2011

(86) PCT No.: PCT/JP2011/053722
§ 371 (c)(1),
(2), (4) Date: Jul. 29, 2013

(87) PCT Pub. No.: WO2012/114438
PCT Pub. Date: Aug. 30, 2012

(65) Prior Publication Data
US 2013/0305761 A1  Nov. 21, 2013

(51) Int. Cl.
*B60H 1/32* (2006.01)
*B60K 6/40* (2007.10)

(52) U.S. Cl.
CPC ............ *B60H 1/3223* (2013.01); *B60H 1/3229* (2013.01); *B60K 6/40* (2013.01)

(58) Field of Classification Search
CPC ....... B60H 1/3229; B60H 1/3223; B60K 6/40
See application file for complete search history.

(56) References Cited

U.S. PATENT DOCUMENTS

| 5,335,745 | A  | * | 8/1994  | Goor ............................. 180/232 |
| 6,508,348 | B2 | * | 1/2003  | Sugano ..................... 192/110 B |
| 7,588,117 | B2 | * | 9/2009  | Fukuda ........................ 180/291 |
| 8,292,011 | B2 | * | 10/2012 | Cimatti et al. ............. 180/65.22 |
| 8,596,403 | B2 | * | 12/2013 | Cunningham et al. ........ 180/300 |
| 2003/0230443 | A1 | * | 12/2003 | Cramer et al. ............... 180/65.5 |
| 2015/0107920 | A1 | * | 4/2015  | Sakamoto .................. 180/65.31 |

FOREIGN PATENT DOCUMENTS

| JP | 4230014 A | 6/1999 |
| JP | 2002500978 A | 1/2002 |
| JP | 2009103100 A | 5/2009 |
| JP | 2010158991 | 7/2010 |
| JP | 2011020623 | 2/2011 |

OTHER PUBLICATIONS

Search Report for International Patent Application No. PCT/JP2011/053722; Mar. 15, 2011.

* cited by examiner

*Primary Examiner* — Allen Flanigan
*Assistant Examiner* — Filip Zec
(74) *Attorney, Agent, or Firm* — Barnes & Thornburg LLP

(57) ABSTRACT

In an arrangement structure for an air-conditioning compressor in a hybrid electric vehicle, an engine, a power generating motor, a driving motor, and an air-conditioning compressor are disposed in an engine room, the engine and the power generating motor being arranged in series, in which the air-conditioning compressor is arranged on a side portion of the power generating motor. The power generating motor and the driving motor are provided in parallel with each other in a vehicle longitudinal direction and are accommodated respectively in separate motor cases, and one of the motor cases on which the air-conditioning compressor is fixed is arranged at a position behind and higher than another one of the motor cases.

3 Claims, 3 Drawing Sheets

ARRANGEMENT STRUCTURE FOR AIR-CONDITIONING COMPRESSOR IN HYBRID ELECTRIC VEHICLE

PRIORITY CLAIM

This patent application is a U.S. National Phase of International Patent Application No. PCT/JP2011/053722, filed 21 Feb. 2011, the disclosure of which is incorporated herein by reference in its entirety.

TECHNICAL FIELD

The present invention relates to an arrangement structure for an air-conditioning compressor in a hybrid electric vehicle (HEV) that employs a series system.

BACKGROUND ART

FIGS. 5 and 6 show a layout example of various equipments or devices within an engine room of a conventional vehicle that runs by using only power of a vehicle engine as a driving force.

FIG. 5 is a partial plan view illustrating a layout example of various devices within an engine room of a conventional vehicle. FIG. 6 is a partial side view thereof. As shown in these figures, in the conventional vehicle, an engine 102 is arranged on a right side of the vehicle with respect to a vehicle widthwise center line CL of an engine room 101. A transmission 106 is arranged continuously from the engine 102 on a left side of the vehicle. A battery 120 (12 volt) is arranged above the transmission 106. An air-conditioning compressor 113 and an alternator 121, which are accessories, are respectively mounted to a front portion and a rear portion of the engine 102.

When the vehicle employs a layout in which an exhaust pipe 104 extends from a front side of the engine 102, a radiator 105 is arranged toward the left side so as not to be affected by heat from the exhaust pipe 104. In FIGS. 5 and 6, reference characters S1 to S3 denote engine mounts, and reference numeral 110 denotes a brake fluid pressure generating device such as a brake master cylinder and a brake booster. In FIG. 6, reference character Cc denotes a crank center (a center of a crankshaft) of the engine, and reference character Tc denotes a center of an output shaft of the transmission.

In recent years, a hybrid electric vehicle (HEV) equipped with an engine and an electric motor so as to reduce emissions and improve fuel economy has been provided. The hybrid electric vehicles are driven by using various systems such as a series system, a parallel system, a motor-assisted system, and a series/parallel system (switchover system). In the series system in which an engine and a power generating motor are arranged in series, the power generating motor is driven by the engine, electric power generated thereby is charged into a battery, and a driving motor is driven by using the electric power charged in the battery to rotate wheels.

In the conventional vehicle using only the power of the engine 102 as the driving force as shown in FIGS. 5 and 6, the air-conditioning compressor 113 is driven by the engine 102. In the hybrid electric vehicle, however, the engine is sometimes stopped. It is thus necessary to drive an air-conditioning compressor by an electric motor (e.g., see Patent Document 1). In actual cases, an electric compressor driven by an electric motor incorporated therein is used as the air-conditioning compressor.

With regard to an arrangement structure for the air-conditioning compressor, Patent Document 2 proposes a configuration in which an electric motor section of an air-conditioning compressor is arranged closer to a center of gravity of an engine with smaller vibration, thereby suppressing a vibrating force on the electric motor section to be small and preventing damage to the electric motor.

Furthermore, Patent Document 3 proposes a configuration in which a projection portion is provided on a compressor housing, and a rear surface of the projection portion on a driving engine side is arranged closer to the engine than an end surface of an inverter housing on the engine side. Accordingly, even when a mounting leg portion is broken with an electric compressor receiving a load from a side member in a vehicle crash, the projection portion comes into interference with the engine before an inverter device to stop movement of the electric compressor. Interference between the inverter device and the engine is thereby avoided to prevent damage to the inverter device.

PRIOR ART DOCUMENT

Patent Document

Patent Document 1: Japanese Patent Laid-Open Publication No. 9-076740
Patent Document 2: Japanese Patent Publication No. 4230014
Patent Document 3: Japanese Patent Laid-Open Publication No. 2009-103100

SUMMARY OF THE INVENTION

Problems to be Solved by the Invention

The air-conditioning compressor mounted on the hybrid electric vehicle is disadvantageously increased in size due to the electric motor incorporated therein for driving the air-conditioning compressor, and it is thus difficult to ensure an arrangement place or space thereof.

The present invention has been made in view of the conventional art described above, and an object thereof is to provide an arrangement structure for an air-conditioning compressor in a hybrid electric vehicle, in which the air-conditioning compressor can be reasonably arranged within an engine room.

Means for Solving the Problems

To achieve the above object, the present invention provides an arrangement structure for an air-conditioning compressor in a hybrid electric vehicle, in which an engine, a power generating motor, a driving motor, and an air-conditioning compressor are arranged in an engine room, and the engine and the power generating motor are arranged in series, wherein the air-conditioning compressor is arranged on a side portion of the power generating motor or the driving motor in a vehicle longitudinal direction.

In a preferred embodiment of the arrangement structure for an air-conditioning compressor in a hybrid electric vehicle according to the present invention described above, following aspects may be employed.

The power generating motor and the driving motor may be provided in parallel with each other in a vehicle longitudinal direction, the power generating motor and the driving motor are accommodated respectively in separate motor cases, and the air-conditioning compressor may also be fixed on a side portion of one of the motor cases.

In the above embodiment, the one of the motor cases on which the air-conditioning compressor is fixed may also be arranged at a position behind and higher than another one of the motor cases.

Moreover, the air-conditioning compressor may be fixed on a side portion of the motor case in which the driving motor is accommodated.

Furthermore, it may be desired that a coupling plane connecting the engine and the power generating motor, and a coupling plane connecting the driving motor and a transmission that transmits a driving force thereof may be located in coplanar relation with each other.

The present invention is not limited to the embodiment described above, and may further encompass other aspects that fall within the spirit of the invention.

Effects of the Invention

In accordance with the embodiment of the present invention described above, the air-conditioning compressor is arranged and fixed on the side portion of the power generating motor or the driving motor. Accordingly, a mounting surface for the air-conditioning compressor can be easily ensured, and the air-conditioning compressor can be reasonably arranged within the engine room. Moreover, since the air-conditioning compressor generates a vibration, the air-conditioning compressor formerly needed to be mounted to a vehicle body via an elastic member. However, in the present embodiment, the air-conditioning compressor is fixed on the side portion of the power generating motor or the driving motor that is mounted to the vehicle body via an elastic member, and accordingly, the elastic member exclusively for the air-conditioning compressor becomes unnecessary and the number of components can be reduced while the vibration of the air-conditioning compressor is prevented from being transmitted to other components.

In accordance with the preferred embodiment described above, the power generating motor and the driving motor are also provided in parallel with each other in the vehicle longitudinal direction. Thus, a lateral length of a device including the motors can be shortened, and an arrangement space for the air-conditioning compressor can be easily ensured within the engine room. In addition, since the air-conditioning compressor is fixed on the side portion of the one of the motor cases, high accuracy can be ensured for a mounting surface (a side surface of the one of the motor cases) as compared to a mounting surface formed across two components. Consequently, the air-conditioning compressor that generates a vibration can be reliably mounted with high rigidity.

Since the one of the motor cases on which the air-conditioning compressor is fixed is arranged at a position behind and higher than the another one of the motor cases, the air-conditioning compressor can be arranged at a position unlikely to be damaged by deformation of the vehicle due to an impact load applied from a front side. The air-conditioning compressor can be thereby effectively protected from impacts. Since the air-conditioning compressor can be arranged at a higher position, gravel or water splashed by the running vehicle is blocked from reaching the air-conditioning compressor, thereby improving durability of the air-conditioning compressor.

Furthermore, since the air-conditioning compressor is not fixed on the side portion of the motor case of the power generating motor coupled to the engine, but is fixed to the motor case of the driving motor arranged behind the power generating motor, the air-conditioning compressor is positioned apart from a mount for the engine or the like, and the arrangement or shape of the mount is made free from restriction. The mount for the engine or the like can be thereby arranged at an optimum position.

EMBODIMENT FOR CARRYING OUT THE INVENTION

Figure 1:
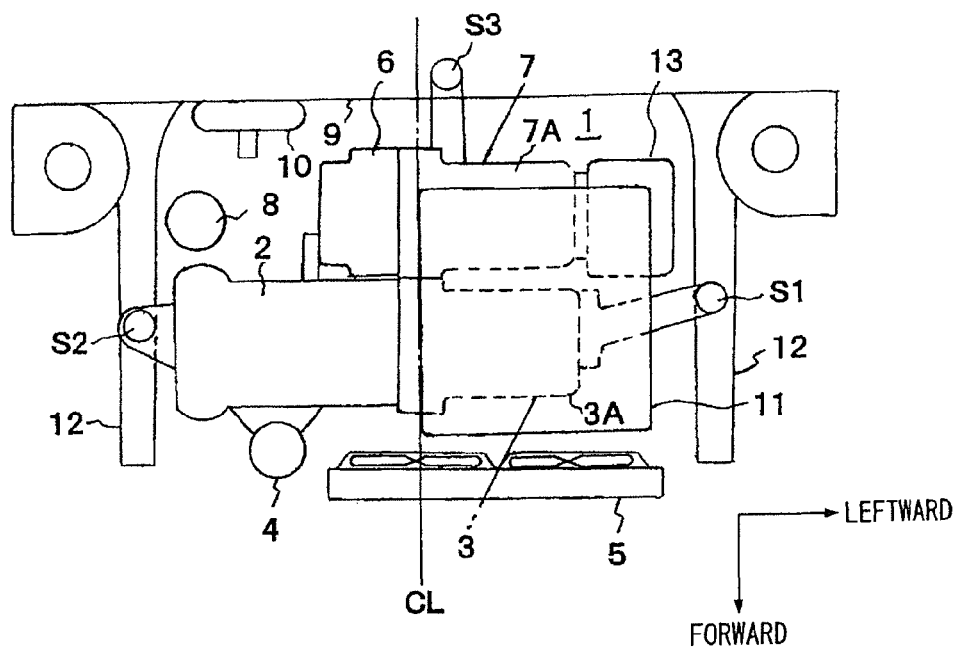
FIG. 1 is a schematic plan view of an engine room of a vehicle illustrating an arrangement structure for an air-conditioning compressor according to one embodiment of the present invention.

In the following, an embodiment of the present invention will be described with reference to the accompanying drawings. It is further to be noted that terms of directions (right, left, front, and rear) in the description respectively indicate right, left, front, and rear directions of a vehicle in a state shown in the drawings or in a normal state.

Embodiment

The present embodiment is applied to a hybrid electric vehicle (HEV) that employs a series system. As shown in FIG. 1, an engine 2 and a power generating motor 3 are arranged in series and coupled together in a vehicle width direction within an engine room 1 of a vehicle that employs a series system.

To be more specific, the engine 2 is arranged on a right side (a left side in FIG. 1) of the vehicle with respect to a vehicle widthwise center line CL. The power generating motor 3 is arranged in series therewith on a left side thereof. An exhaust pipe 4 is connected to a front side of the engine 2 (a lower side in FIG. 1) so as to extend from the engine 2. A radiator 5 that cools the engine 2 and an inverter 11 is arranged toward the left side ahead of the power generating motor 3 so as not to be affected by heat from the exhaust pipe 4.

A driving motor 7 that drives the vehicle and a transmission 6 that amplifies a driving force generated by the driving motor 7 and transmits the driving force to a drive shaft (axle) are arranged in series and coupled together in the vehicle width direction on the rear side of the engine 2 and the power generating motor 3 (an upper side in FIG. 1) within the engine room 1. More specifically, the transmission 6 is arranged behind the engine 2 on the right side with respect to the vehicle widthwise center line CL, and the driving motor 7 is arranged on the left side thereof. A coupling plane connecting the engine 2 and the power generating motor 3, and a coupling plane connecting the transmission 6 and the driving motor 7 are located in coplanar relation with each other so as to improve accuracy of machining or positioning workings.

A brake vacuum pump 8 is arranged on the right side of the vehicle with respect to the transmission 6 and on the rear side of the engine 2. A brake fluid pressure generating device 10 for braking such as a brake master cylinder or a brake booster is disposed on a dash panel 9 disposed behind the brake vacuum pump 8.

In some occasions, since the hybrid electric vehicle sometimes runs with the engine 2 stopped, an intake vacuum of the engine 2 cannot be utilized or employed as an assist force for the operation of the brake. It is this required to be provided with the brake vacuum pump 8 that generates a vacuum. Then, on the present embodiment, the brake vacuum pump 8 is arranged at a position where an alternator, which becomes unnecessary in hybrid electric vehicles, was formerly arranged (rightward behind the engine 2). Since the arranged position of the brake vacuum pump 8 is close to the brake master cylinder 10, a brake pipe, not shown, that connects the brake vacuum pump 8 and the brake master cylinder 10 can be shortened.

Furthermore, the inverter 11 that converts electric power between each motor (the power generating motor 3 and the driving motor 7) and a battery is arranged on the right side with respect to the vehicle widthwise center line CL and above the power generating motor 3 and the driving motor 7 within the engine room 1. Further, in FIG. 2, reference character Cc denotes a crank center (a center of a crankshaft) of the engine 2, reference character Tc denotes a center of an output shaft of the transmission 6, and reference character Mc denotes a center of a rotating shaft of the driving motor 7.

In the present embodiment, the engine 2 and the power generating motor 3, and the transmission 6 and the driving motor 7, which are respectively arranged in series in the vehicle width direction, are composed as one unit that is elastically supported by a pair of right and left apron side members 12 via engine mounts S1 and S2 at right and left two positions, and elastically supported by a suspension member (not shown) via an engine mount S3 at one position in a vehicle widthwise center portion at a rear end.

In the present embodiment, an air-conditioning compressor 13 is also arranged and fixed on a side portion of the driving motor 7. In the hybrid electric vehicle of the present embodiment, the engine 2 is used not for driving the vehicle, but only for driving the power generating motor 3 to generate electric power. Thus, the engine 2 can be made smaller than that of a conventional vehicle that runs by using only engine power as a driving force, so that the engine can be laid out to be located toward the right side of the vehicle. Thus, the engine 2 can be arranged on the right side with respect to the power generating motor 3 and the driving motor 7. As a result, a space can be formed between the power generating motor 3 or the driving motor 7 and the apron side member 12 leftward of the power generating motor 3 or the driving motor 7 (a side where the engine 2 is not arranged) as shown in FIG. 1. In the present embodiment, the air-conditioning compressor 13 is arranged and fixed on the side portion of the driving motor 7 by utilizing the space. Moreover, since the hybrid electric vehicle sometimes runs with the engine 2 stopped, the air-conditioning compressor 13 needs to be of electrically-operated type, not of engine-driven type. Thus, the air-conditioning compressor 13 incorporates an electric motor, not shown, therein as a power source. An electric motor section 13A and a compressor section 13B are coupled together in series as shown in FIG. 4 to constitute the air-conditioning compressor 13.

Figure 2:
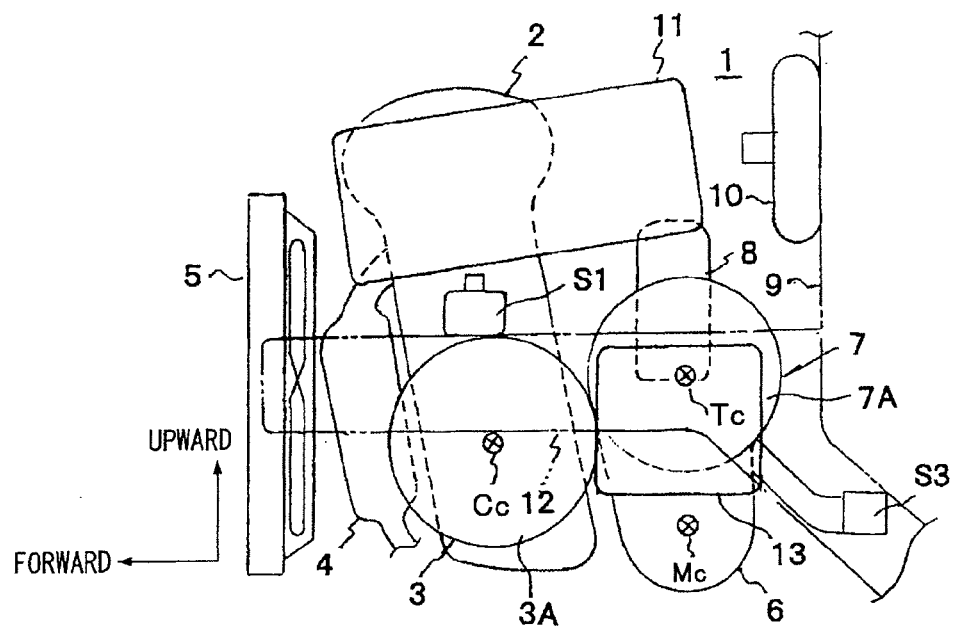
FIG. 2 is a schematic side view of an engine room of a vehicle illustrating an arrangement structure for an air-conditioning compressor according to one embodiment of the present invention.

The power generating motor 3 and the driving motor 7, which are provided in parallel in a vehicle longitudinal direction on the left side of the vehicle with respect to the vehicle widthwise center line CL, are respectively accommodated in separate motor cases 3A and 7A. In the present embodiment, the air-conditioning compressor 13 is fixed on a side portion (a left-side end portion) of the motor case 7A in which the driving motor 7 is accommodated. As shown in FIG. 2, the motor case 7A on which the air-conditioning compressor 13 is fixed is arranged at a position behind and higher than the motor case 3A in which the power generating motor 3 is accommodated.

Figure 3:
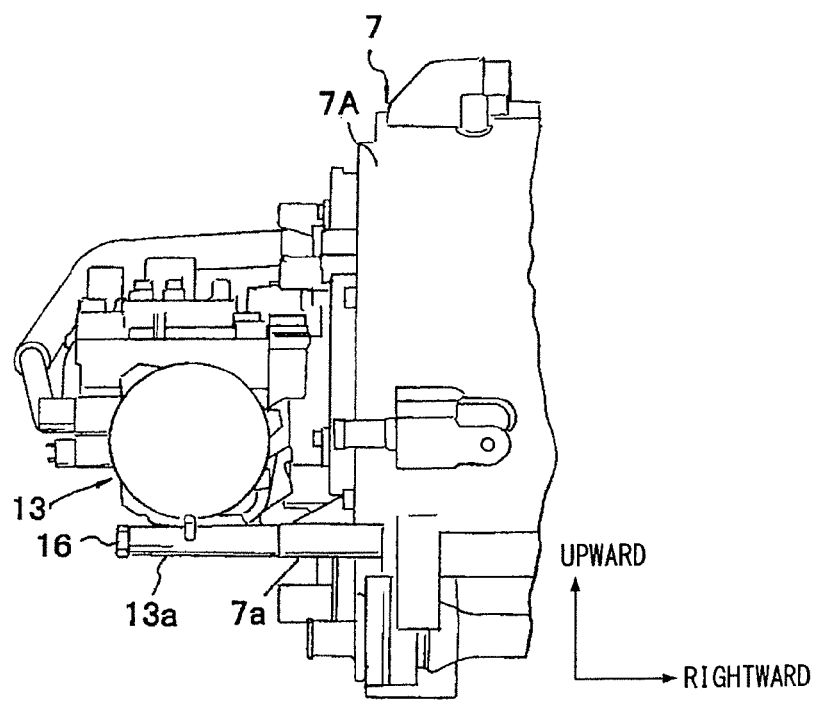
FIG. 3 is a partial rear view illustrating a mounting structure for the air-conditioning compressor.
Figure 4:
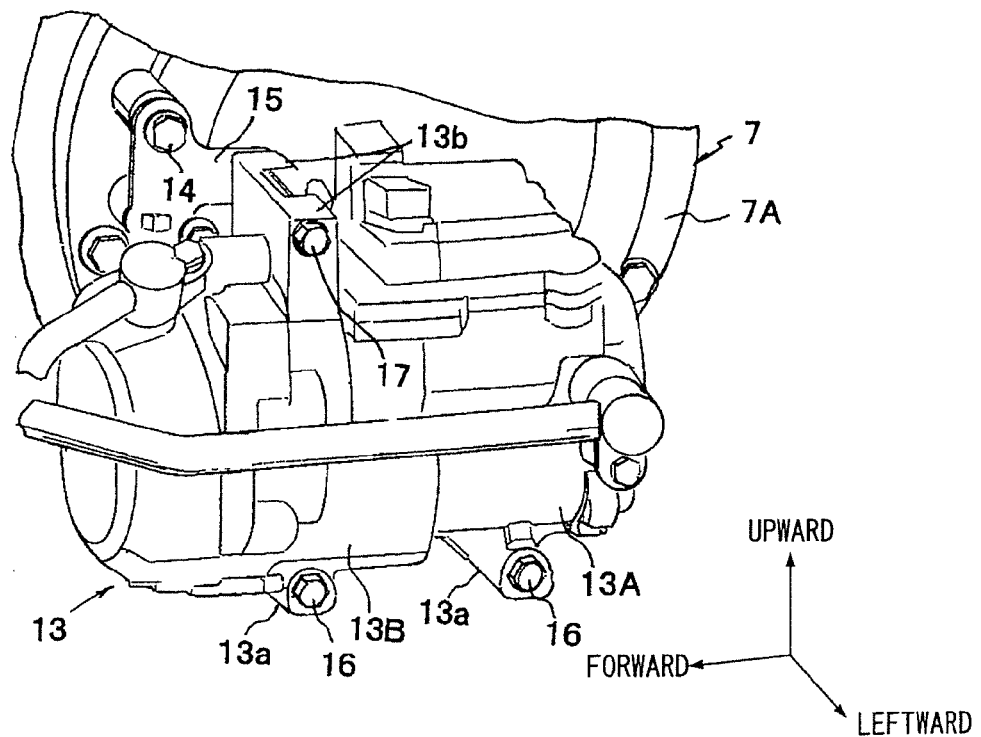
FIG. 4 is a partial perspective view of a mounting section for the air-conditioning compressor.
Figure 5:
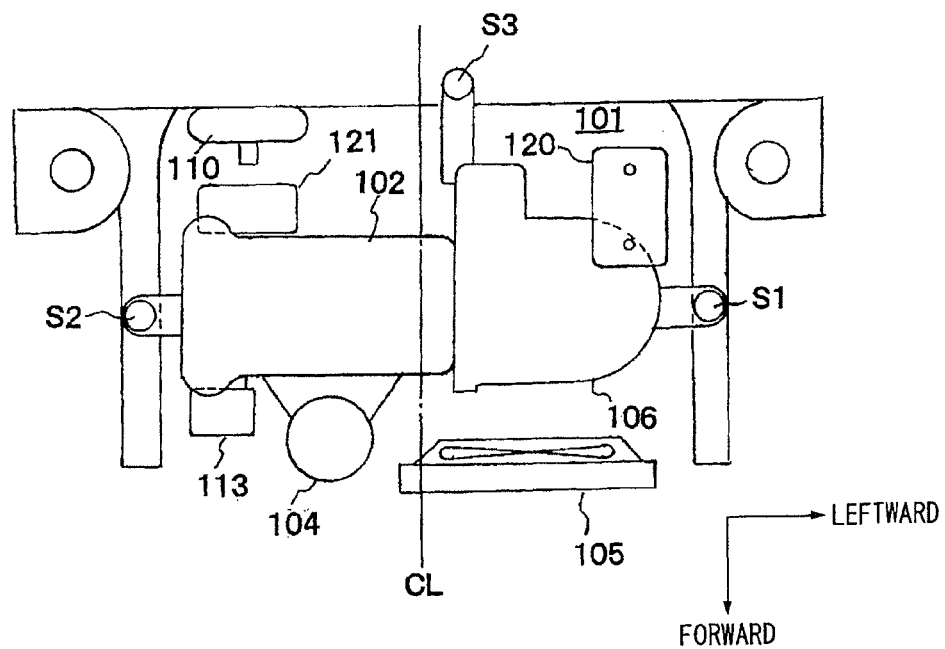
FIG. 5 is a partial plan view illustrating a layout example of various devices within an engine room of a conventional vehicle.
Figure 6:
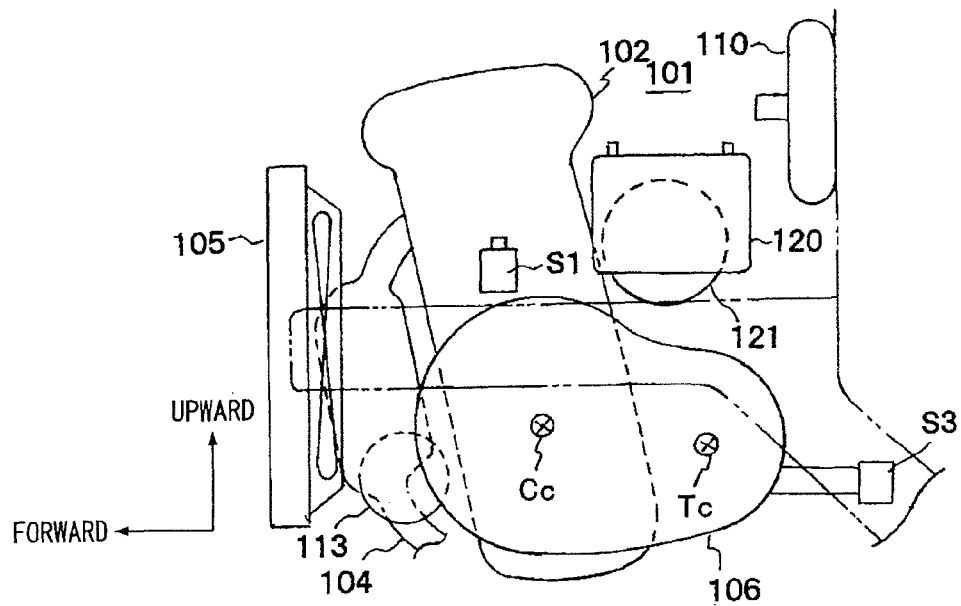
FIG. 6 is a partial side view illustrating a layout example of various devices within an engine room of a conventional vehicle.

Herein, a mounting structure for mounting the air-conditioning compressor 13 to the side portion of the motor case 7A is shown in FIGS. 3 and 4. The air-conditioning compressor 13 is arranged with a longitudinal direction thereof aligned with the vehicle longitudinal direction. A lower-portion mounting boss 13a that extends in the vehicle width direction is integrally formed at each of front and rear positions of a bottom portion of the air-conditioning compressor 13. A threaded boss 7a is integrally formed at a position corresponding to each of the bosses 13a on a lower bottom portion of the side portion (the left-side end portion) of the motor case 7A. The air-conditioning compressor 13 is mounted to the motor case 7A at a bottom portion thereof by inserting, from a lateral side, a long bolt 16 through each of the bosses 13a formed on the bottom portion, and screwing the long bolt 16 into each of the bosses 7a of the motor case 7A.

Furthermore, as shown in FIG. 4, a lateral T-shaped bracket 15 is also mounted to a side end surface (the left-side end portion) of the motor case 7A with a bolt 14. A bracket 13b is provided in a manner of projecting integrally from an upper portion of the air-conditioning compressor 13. The air-conditioning compressor 13 is mounted to the side end surface of the motor case 7A at the upper portion thereof by inserting, from the lateral side, a bolt 17 through the bracket 3b on the upper portion of the air-conditioning compressor 13, and screwing the bolt 17 into a threaded hole of the bracket 15. Herein, since the mounting bolts 16 and 14 of the air-conditioning compressor 13 are both tightened from the lateral side (the left side) of the vehicle and the bosses 13a and the bracket 13b are formed relatively high (long) so as to reach the left side of the air-conditioning compressor 13, the air-conditioning compressor 13 can be easily attached to and detached from the motor case 7A.

As described above, in the present embodiment, the air-conditioning compressor 13 is arranged and fixed on the side portion of the driving motor 7. Accordingly, a mounting surface for the air-conditioning compressor 13 can be easily ensured, and the air-conditioning compressor 13 can be reasonably arranged within the engine room 1.

Moreover, since the air-conditioning compressor 13 generates a vibration, the air-conditioning compressor 13 needs to be mounted to a vehicle body via an elastic member in a conventional structure. However, in the present embodiment, since the air-conditioning compressor 13 is fixed on the side portion of the driving motor 7 that is elastically supported by a vehicle body together with the engine 2, the power generating motor 3 and the transmission 6 via the engine mounts S1 to S3, the elastic member exclusively for the air-conditioning compressor 13 thus becomes unnecessary, and the number of components can be reduced while the vibration of the air-conditioning compressor 13 is prevented from being transmitted to other components.

In the present embodiment, the power generating motor 3 and the driving motor 7 are also provided in parallel with each other in the vehicle longitudinal direction. Thus, a lateral length of a device including the motors can be shortened, and a space for arranging the air-conditioning compressor 13 can be easily ensured within the engine room 1. In addition, since the air-conditioning compressor 13 is fixed only on the side portion of the motor case 7A in which the driving motor 7 is accommodated, the high surface performance or accuracy can be ensured for the mounting surface (the side surface of the motor case 7A) as compared to a mounting surface formed across two components (the motor cases 3A and 7A). Consequently, the air-conditioning compressor 13 that generates a vibration can be reliably mounted with high rigidity.

Furthermore, in the present embodiment, since one of the motor cases 7A on which the air-conditioning compressor 13 is fixed is arranged at a position behind and higher than another one of the motor cases 3A, the air-conditioning compressor 13 can be arranged at a position unlikely to be damaged by an impact load applied to the vehicle body from the front side. The air-conditioning compressor 13 can be thereby effectively protected from impacts. In addition, since the air-conditioning compressor 13 can be arranged at a higher position, gravel (stone or like) or water splashed by the running vehicle is inhibited from reaching the air-conditioning compressor 13, thereby improving the durability of the air-conditioning compressor 13.

Still furthermore, in the present embodiment, the air-conditioning compressor 13 is not fixed on the side portion of not the motor case 3A of the power generating motor 3 coupled to the engine 2, but is fixed to the motor case 7A of the driving motor 7 arranged behind the power generating motor 3. Accordingly, the drive shaft is arranged below the air-conditioning compressor 13, thus protecting a lower portion of the air-conditioning compressor 13 from being damaged.

Moreover, since the air-conditioning compressor 13 does not restrict positions of the engine mounts S1 to S3 (particularly, the engine mount S1) for mounting the engine 2 or the like to the vehicle body, the engine mounts S1 to S3 can be arranged at optimum positions.

Furthermore, in the described embodiment, although the air-conditioning compressor 13 is arranged and fixed on the side portion of the driving motor 7, similar or identical advantages to those described above can be attained even when the air-conditioning compressor 13 is arranged and fixed on the side portion of the power generating motor 3.

It is further to be noted that the present invention is not limited to the aforementioned embodiment and can further encompass changes and modifications that fall within the scope defined in the appended claims.

The invention claimed is:

1. An arrangement structure for an air-conditioning compressor in a hybrid electric vehicle, in which an engine, a power generating motor, a driving motor, and an air-conditioning compressor are disposed in an engine room, and the engine and the power generating motor are arranged in series,
   wherein the air-conditioning compressor is arranged on a side portion of the power generating motor or the driving motor in a vehicle longitudinal direction,
   wherein the power generating motor and the driving motor are provided in parallel with each other in a vehicle longitudinal direction and are accommodated respectively in separate motor cases, and the air-conditioning compressor is fixed on a side portion of one of the motor cases, and the one of the motor cases on which the air-conditioning compressor is fixed is arranged at a position behind and higher than another one of the motor cases.

2. The arrangement structure for an air-conditioning compressor in a hybrid electric vehicle according to claim 1, wherein the air-conditioning compressor is fixed on a side portion of the motor case in which the driving motor is accommodated.

3. An arrangement structure for an air-conditioning compressor in a hybrid electric vehicle, in which an engine, a power generating motor, a driving motor, and an air-conditioning compressor are disposed in an engine room, and the engine and the power generating motor are arranged in series, wherein the air-conditioning compressor is arranged on a side portion of the power generating motor or the driving motor in a vehicle longitudinal direction,
   wherein the power generating motor and the driving motor are provided in parallel with each other in a vehicle longitudinal direction and are accommodated respectively in separate motor cases, and the air-conditioning compressor is fixed on a side portion of one of the motor cases, and a coupling plane connecting the engine and the power generating motor, and a coupling plane connecting the driving motor and a transmission that transmits a driving force thereof, are located in coplanar relation with each other.

* * * * *